United States Patent
Akiyama et al.

(10) Patent No.: US 10,101,170 B2
(45) Date of Patent: Oct. 16, 2018

(54) PREDICTING AN IMPACT OF A MOVING PHENOMENON ON A TRAVELLING VEHICLE

(71) Applicant: International Business Machines Corporation, Armonk, NY (US)

(72) Inventors: Kazuhito Akiyama, Machida (JP); Mari Abe Fukuda, Tokyo (JP); Sanehiro Furuichi, Tokyo (JP); Hiroya Ogihara, Kawasaki (JP); Taku Sasaki, Machida (JP); Asuka Unno, Tokyo (JP); Gaku Yamamoto, Machida (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/401,512

(22) Filed: Jan. 9, 2017

(65) Prior Publication Data

US 2018/0195876 A1    Jul. 12, 2018

(51) Int. Cl.
*G01C 21/36* (2006.01)
*G01C 21/20* (2006.01)

(52) U.S. Cl.
CPC ......... *G01C 21/3694* (2013.01); *G01C 21/20* (2013.01); *G01C 21/3667* (2013.01)

(58) Field of Classification Search
CPC . G01C 21/3694; G01C 21/20; G01C 21/3667
See application file for complete search history.

(56) References Cited

U.S. PATENT DOCUMENTS

| | | | | |
|---|---|---|---|---|
| 6,720,920 B2* | 4/2004 | Breed | ................. | B60N 2/2863 342/357.31 |
| 8,860,564 B2* | 10/2014 | Rubin | ..................... | G08G 9/02 340/435 |

(Continued)

FOREIGN PATENT DOCUMENTS

JP    2007287168 A    11/2007

OTHER PUBLICATIONS

Abe, M. et al., "Dynamics-based Animation System," In IPSJ Graphi8cs and CAD (CG), Aug. 23, 1999, pp. 37-42.

(Continued)

*Primary Examiner* — Courtney D Heinle
(74) *Attorney, Agent, or Firm* — Cuenot, Forsythe & Kim, LLC

(57) ABSTRACT

Phenomenon data for at least one moving phenomenon that affects travel on at least one roadway can be received. An impact distribution for the phenomenon over a plurality of phenomenon cells can be determined and corresponding phenomenon impact distribution data can be generated. For at least one vehicle, a plurality of candidate routes for the vehicle to reach an intended destination can be determined. For each candidate route, whether the candidate route intersects with at least phenomenon cell impacted by the phenomenon can be determined. If so, a vehicle simulation agent for that vehicle and that candidate route can be initialized. Using the vehicle simulation agent, an impact of the phenomenon on the vehicle can be determined based on the phenomenon impact distribution data. Data indicating the impact of the phenomenon on travel of the vehicle if the vehicle were to travel along the respective the route can be output.

24 Claims, 5 Drawing Sheets

(56) References Cited

U.S. PATENT DOCUMENTS

| | | | |
|---|---|---|---|
| 9,137,847 B1 | 9/2015 | Ayyagari et al. | |
| 9,851,214 B1* | 12/2017 | Chintakindi | G06N 5/04 |
| 2005/0015197 A1* | 1/2005 | Ohtsuji | G01C 21/34 |
| | | | 701/533 |
| 2006/0116816 A1* | 6/2006 | Chao | G01C 21/3415 |
| | | | 701/414 |
| 2007/0049260 A1* | 3/2007 | Yuhara | G01C 21/3694 |
| | | | 455/414.3 |
| 2007/0055443 A1* | 3/2007 | Sumizawa | G01C 21/3461 |
| | | | 701/423 |
| 2008/0140318 A1* | 6/2008 | Breed | B60N 2/2863 |
| | | | 702/3 |
| 2009/0083657 A1* | 3/2009 | Tsuji | G01C 21/26 |
| | | | 715/781 |
| 2009/0088965 A1* | 4/2009 | Burckart | G01C 21/3492 |
| | | | 701/533 |
| 2009/0312943 A1* | 12/2009 | Kelly | G01C 21/26 |
| | | | 701/465 |
| 2010/0036606 A1* | 2/2010 | Jones | G01C 21/3446 |
| | | | 701/533 |
| 2010/0106603 A1 | 4/2010 | Dey et al. | |
| 2010/0161222 A1* | 6/2010 | Zhang | G01C 21/3461 |
| | | | 701/414 |
| 2011/0307168 A1* | 12/2011 | Kieff | G01C 21/3492 |
| | | | 701/415 |
| 2012/0232787 A1* | 9/2012 | Kunath | G01C 21/3461 |
| | | | 701/423 |
| 2012/0310536 A1* | 12/2012 | Katayama | G01C 21/3461 |
| | | | 702/3 |
| 2013/0018577 A1* | 1/2013 | Gooding | G01C 21/3407 |
| | | | 701/423 |
| 2013/0144526 A1* | 6/2013 | Fuchs | G01C 21/3492 |
| | | | 701/533 |
| 2013/0218449 A1* | 8/2013 | Hymel | G01C 21/3461 |
| | | | 701/408 |
| 2013/0304379 A1* | 11/2013 | Fulger | G01C 21/3415 |
| | | | 701/533 |
| 2013/0345979 A1* | 12/2013 | Oostveen | G01C 21/3694 |
| | | | 701/533 |
| 2014/0046585 A1* | 2/2014 | Morris, IV | G01C 21/00 |
| | | | 701/468 |
| 2014/0222321 A1* | 8/2014 | Petty | G01C 21/3492 |
| | | | 701/117 |
| 2014/0375678 A1* | 12/2014 | Kjeldergaard | G06T 3/40 |
| | | | 345/629 |
| 2015/0073695 A1* | 3/2015 | Groves | G01W 1/02 |
| | | | 701/400 |
| 2015/0149078 A1* | 5/2015 | Profous | G01C 21/3446 |
| | | | 701/426 |
| 2015/0168169 A1* | 6/2015 | Caceres | G01C 21/3492 |
| | | | 701/537 |
| 2015/0198452 A1* | 7/2015 | Gupta | G01C 21/3461 |
| | | | 701/533 |
| 2015/0292894 A1* | 10/2015 | Goddard | G01C 21/3492 |
| | | | 701/400 |
| 2015/0302622 A1* | 10/2015 | Takechi | G01W 1/10 |
| | | | 345/629 |
| 2016/0307446 A1* | 10/2016 | Edakunni | G08G 1/13 |
| 2017/0067750 A1* | 3/2017 | Day | G01C 21/3461 |
| 2017/0219374 A1* | 8/2017 | Sitarski | G01C 21/3676 |
| 2017/0262790 A1* | 9/2017 | Khasis | G01C 21/3461 |
| 2017/0263116 A1* | 9/2017 | Lorenz | G08G 1/0125 |
| 2017/0322041 A1* | 11/2017 | Stephens | G01C 21/3453 |
| 2017/0350715 A1* | 12/2017 | Tanizaki | G01C 21/3453 |

OTHER PUBLICATIONS

"About IoT for Automative (Experimental)," [online] IBM Bluemix Docs, Nov. 29, 2016 [retrieved Jan. 9, 2017] retrieved from the Internet: <https://console.ng.bluemix.net/docs/services/IoTAutomotive/iotautomotive_overview.html#about_iotautomotive>, 4 pg.

* cited by examiner

PREDICTING AN IMPACT OF A MOVING PHENOMENON ON A TRAVELLING VEHICLE

BACKGROUND

The present invention relates to data processing systems, and more specifically, to navigation systems.

Many automobile drivers find navigation systems more convenient to use than traditional maps, and navigation systems have largely displaced the use of traditional maps. Navigation systems represent a convergence of a number of diverse technologies, including database technologies and global positioning systems (GPSs). Navigation systems typically use a road database in which street names or numbers and street addresses are encoded as geographic coordinates. The navigation systems can receive GPS coordinates for a particular automobile and, using the road database, determine directions a driver should navigate from a current location to arrive at a desired destination. The directions may be presented to the user, for example via a dedicated navigation unit, a smart phone or a tablet computer, to guide the user to the desired destination. In some cases, the directions may be provided to an autonomous vehicle, and the autonomous vehicle can follow the directions to arrive at a desired destination.

Currently, navigation systems sometimes notify drivers of traffic congestion that may cause travel delays on certain roadways. These current systems, however, do not consider trends for phenomena, for example weather conditions, and do not indicate the impact of phenomenon trends over a plurality of candidate routes.

SUMMARY

A method includes receiving phenomenon data for at least one moving phenomenon that affects travel on at least one roadway. The method also can include, based on the phenomenon data, determining an impact distribution for the phenomenon over a plurality of phenomenon cells and generating corresponding phenomenon impact distribution data. The method also can include storing the phenomenon impact distribution data to a functional data structure. The method also can include, for at least one vehicle, determining a plurality of candidate routes for the vehicle to reach an intended destination. The method also can include, for each of the plurality of candidate routes, determining whether the candidate route intersects with at least one of the plurality of phenomenon cells impacted by the phenomenon. The method also can include, responsive to determining that the candidate route intersects with at least one of the plurality of phenomenon cells impacted by the phenomenon, initializing a vehicle simulation agent for that vehicle and that candidate route, the vehicle simulation agent simulating travel of the vehicle on the candidate route at each of the plurality of future time intervals. The method also can include, using the vehicle simulation agent, for each of the plurality of future time intervals in which the vehicle is predicted to be in a respective cell impacted by the phenomenon, determining, using a processor, an impact of the phenomenon on the vehicle based on the phenomenon impact distribution data. The method also can include outputting data indicating the impact of the phenomenon on travel of the vehicle if the vehicle were to travel along the respective route. Accordingly, a driver of the vehicle can evaluate the data, and choose a route based on the data, for example a route on which the phenomenon has a least amount of impact.

In one arrangement, the method further can include defining the plurality of phenomenon cells, each phenomenon cell defined for a respective portion of the moving phenomenon. In such an arrangement, generating the corresponding phenomenon impact distribution data can include determining, for each of the phenomenon cells, a respective impact of the phenomenon cell on the vehicle. The method also can include initializing a phenomenon impact agent for each of the plurality of phenomenon cells, each phenomenon impact agent representing a respective one of the plurality of phenomenon cells and a level of impact of the phenomenon on driving conditions in the respective phenomenon cell. Use of the phenomenon impact agents can simplify determining the impact of the phenomenon on the vehicle.

In a further arrangement, the method can include aggregating data indicating the impact of the phenomenon on the vehicle in each of a plurality of phenomenon cells with which the candidate route intersects and normalizing the aggregated data to generate normalized phenomenon impact data. In such an arrangement, outputting the data indicating the impact of the phenomenon on the vehicle can include outputting the normalized phenomenon impact data. The method also can include communicating a notification based on the normalized phenomenon impact data to a driver of the vehicle. The notification can indicate the normalized phenomenon impact data for each of the plurality of candidate routes for the vehicle to reach an intended destination. In one aspect, the normalized phenomenon impact data for each of the plurality of candidate routes can be presented with the respective candidate routes in a map that presents the respective candidate routes. Data indicating a nature of the phenomenon also can be presented in the map with the normalized phenomenon impact data. Based on the notification and/or map, the driver can choose a route to travel to the desired destination, for example a route on which the phenomenon has a smallest level of impact. In a further aspect, the normalized phenomenon impact data can be periodically updated based on recent phenomenon data and a present location of the vehicle, and the updated normalized phenomenon impact data can be output. Thus, the driver of the vehicle can be presented with the most recent impact data, which can help the driver to decide whether to stay on a current route or choose an alternate route.

A system includes a processor programmed to initiate executable operations. The executable operations include receiving phenomenon data for at least one moving phenomenon that affects travel on at least one roadway. The executable operations also can include, based on the phenomenon data, determining an impact distribution for the phenomenon over a plurality of phenomenon cells and generating corresponding phenomenon impact distribution data. The executable operations also can include storing the phenomenon impact distribution data to a functional data structure. The executable operations also can include, for at least one vehicle, determining a plurality of candidate routes for the vehicle to reach an intended destination. The executable operations also can include, for each of the plurality of candidate routes, determining whether the candidate route intersects with at least one of the plurality of phenomenon cells impacted by the phenomenon. The executable operations also can include, responsive to determining that the candidate route intersects with at least one of the plurality of phenomenon cells impacted by the phenomenon, initializing a vehicle simulation agent for that vehicle and that candidate route, the vehicle simulation agent simulating travel of the vehicle on the candidate route at each of the plurality of future time intervals. The executable operations also can include, using the vehicle simulation agent, for each of the plurality of future time intervals in which the vehicle is predicted to be in a respective cell impacted by the phenomenon, determining an impact of the phenomenon on the vehicle based on the phenomenon impact distribution data. The executable operations also can include outputting data indicating the impact of the phenomenon on travel of the vehicle if the vehicle were to travel along the respective the route.

A computer program includes a computer readable storage medium having program code stored thereon. The program code is executable by a processor to perform a method. The method includes receiving, by the processor, phenomenon data for at least one moving phenomenon that affects travel on at least one roadway. The method also can include, based on the phenomenon data, determining, by the processor, an impact distribution for the phenomenon over a plurality of phenomenon cells and generating, by the processor, corresponding phenomenon impact distribution data. The method also can include storing, by the processor, the phenomenon impact distribution data to a functional data structure. The method also can include, for at least one vehicle, determining, by the processor, a plurality of candidate routes for the vehicle to reach an intended destination. The method also can include, for each of the plurality of candidate routes, determining, by the processor, whether the candidate route intersects with at least one of the plurality of phenomenon cells impacted by the phenomenon. The method also can include, responsive to determining that the candidate route intersects with at least one of the plurality of phenomenon cells impacted by the phenomenon, initializing, by the processor, a vehicle simulation agent for that vehicle and that candidate route, the vehicle simulation agent simulating travel of the vehicle on the candidate route at each of the plurality of future time intervals. The method also can include, using the vehicle simulation agent, for each of the plurality of future time intervals in which the vehicle is predicted to be in a respective cell impacted by the phenomenon, determining, by the processor, an impact of the phenomenon on the vehicle based on the phenomenon impact distribution data. The method also can include outputting, by the processor, data indicating the impact of the phenomenon on travel of the vehicle if the vehicle were to travel along the respective the route.

DETAILED DESCRIPTION

Figure 1:
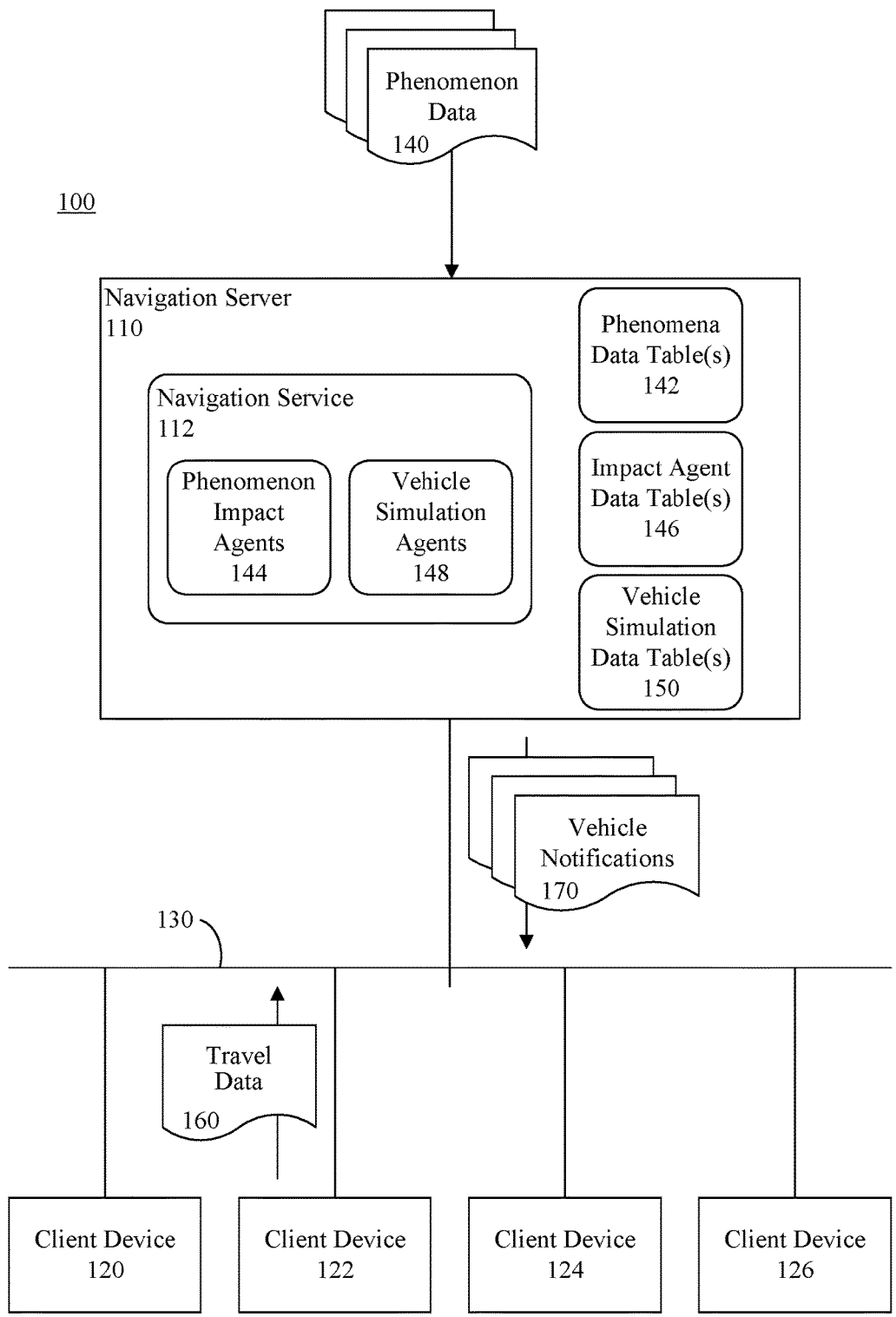
FIG. 1 is a block diagram illustrating an example of a network data processing system.

This disclosure relates to data processing systems, and more specifically, to navigation systems. In accordance with the inventive arrangements disclosed herein, a navigation server can host a navigation service. The navigation service can identify at least one phenomenon. Examples of a phenomenon include, but are not limited to, a weather condition (e.g., wind, rain, fog, etc.), air pollution (e.g., smog), a fire, smoke from a fire, and so on. The navigation service can define a plurality of phenomenon cells for the phenomenon, and initialize a respective phenomenon impact agent for each of the respective phenomenon cells. Each phenomenon impact agent can represent the respective phenomenon cell and a level of impact of the phenomenon on driving conditions in the respective phenomenon cell.

Further, the navigation service can determine a plurality of candidate routes for a vehicle to travel from a present location to a desired destination. The navigation service can initialize a respective vehicle simulation agent for the vehicle for each of the candidate routes. Using the phenomenon impact agents and the vehicle simulation agents, the navigation service can determine, for each of the candidate routes, a level of impact of the phenomenon on travel of the vehicle if the vehicle were to travel along the respective the candidate route. The navigation service can communicate one or more vehicle notifications to a driver of the vehicle. The vehicle notifications can indicate the level of impact of the phenomenon on travel of the vehicle along each of the candidate routes. Accordingly, the driver can evaluate the level of impact along each of the candidate routes in order to select a route to travel to the desired destination.

Several definitions that apply throughout this document now will be presented.

As defined herein, the term "phenomenon" means a spatiotemporal event that affects travel on at least one roadway.

As defined herein, the term "moving phenomenon" means phenomenon that moves or expands over time.

As defined herein, the term "phenomenon cell" means a defined portion of a phenomenon.

As defined herein the term "vehicle simulation agent" means a functional data structure that represents a vehicle and simulates travel of the vehicle along a candidate travel route.

As defined herein the term "phenomenon impact agent" means a functional data structure that represents a phenomenon cell (i.e., a defined portion of a phenomenon), a velocity of the phenomenon cell, and a level of impact of a phenomenon on driving conditions in the phenomenon cell.

As defined herein, the term "client device" means a processing system including at least one processor and memory that requests navigation services from a server. Examples of a client device include, but are not limited to, a navigation unit or system, a tablet computer, a smart phone, a personal digital assistant, a smart watch, smart glasses, and the like. Network infrastructure, such as routers, firewalls, switches, access points and the like, are not client devices as the term "client device" is defined herein.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process.

As defined herein, the term "output" means storing in memory elements, writing to display or other peripheral output device, sending or transmitting to another system, exporting, or similar operations.

As defined herein, the term "driver" means a person (i.e., a human being) driving a vehicle or a processing system configured to automatically drive a vehicle.

As defined herein, the term "automatically" means without user intervention.

FIG. 1 is a block diagram illustrating an example of a computing environment 100. The computing environment 100 can include a navigation server 110 hosting a navigation service 112. The computing environment 100 also can include a plurality of client devices 120, 122, 124, 126. Each of the navigation server 110 and client devices 120-126 can include at least one processor and memory. The client devices 120-126 can communicatively link to the navigation server 110 via at least one communication network 130. The communication network 130 is the medium used to provide communications links between various devices and data processing systems connected together within the computing environment 100. The communication network 130 may include connections, such as wire, wireless communication links, or fiber optic cables. The communication network 130 can be implemented as, or include, any of a variety of different communication technologies such as a WAN, a LAN, a wireless network, a mobile network, a Virtual Private Network (VPN), the Internet, the Public Switched Telephone Network (PSTN), or similar technologies.

In operation, the navigation service 112 can receive phenomenon data 140 from one or more phenomenon data sources, and store the phenomenon data 140 to one or more functional data structures in real time, for example to one or more phenomena data tables 142. For instance, the navigation service 112 can receive the phenomenon data 140 from one or more physical sensors and/or virtual sensors that monitor phenomena affecting travel on roadways, and/or one or more other systems. Examples of such other systems can include weather monitoring systems, air pollution monitoring systems, fire monitoring systems, and the like. The navigation service 112 can continuously receive the phenomenon data 140, receive the phenomenon data 140 while the phenomenon continues to exist, or receive the phenomenon data 140 at discrete time intervals while the phenomenon continues to exist. For example, phenomenon data 140 for the phenomenon can be received at time $t_0$, time $t_1$, time $t_2$, and so on.

In another arrangement, the navigation service 112 can receive phenomenon data 140 from a plurality of client devices 120-126 configured to monitor the phenomenon data 140. For example, one or more of the client devices 120-126 can be configured to monitor data related to phenomena (e.g., precipitation levels, atmospheric particulate levels, etc.). Each client device 120-126 can communicate to the navigation service 112 the data detected by the respective client device 120-126 and location data for the respective client device 120-126. Data collected from a plurality of client devices 120-126 within a particular period of time can be received by the navigation service 112 as phenomenon data 140 for that period of time.

The phenomenon data 140 for each phenomenon can indicate a geographic region affected by the phenomenon, and a level of effect of the phenomenon over the geographic region. For example, if the phenomenon is a rain storm, the phenomenon data 140 can indicate the geographic region covered by precipitation of the rain storm and levels of the precipitation in various portions of the geographic region. If the phenomenon is atmospheric pollution, the phenomenon data 140 can indicate the geographic region covered by the atmospheric pollution (e.g., areas in which the atmospheric pollution exceed a threshold level of polluting particulates) and levels of polluting particulates in various portions of the geographic region. If the phenomenon is a fire, the phenomenon data 140 can indicate the geographic region covered by the fire and levels of the fire, and/or levels of smoke generated by the fire, in various portions of the geographic region.

Figure 2:
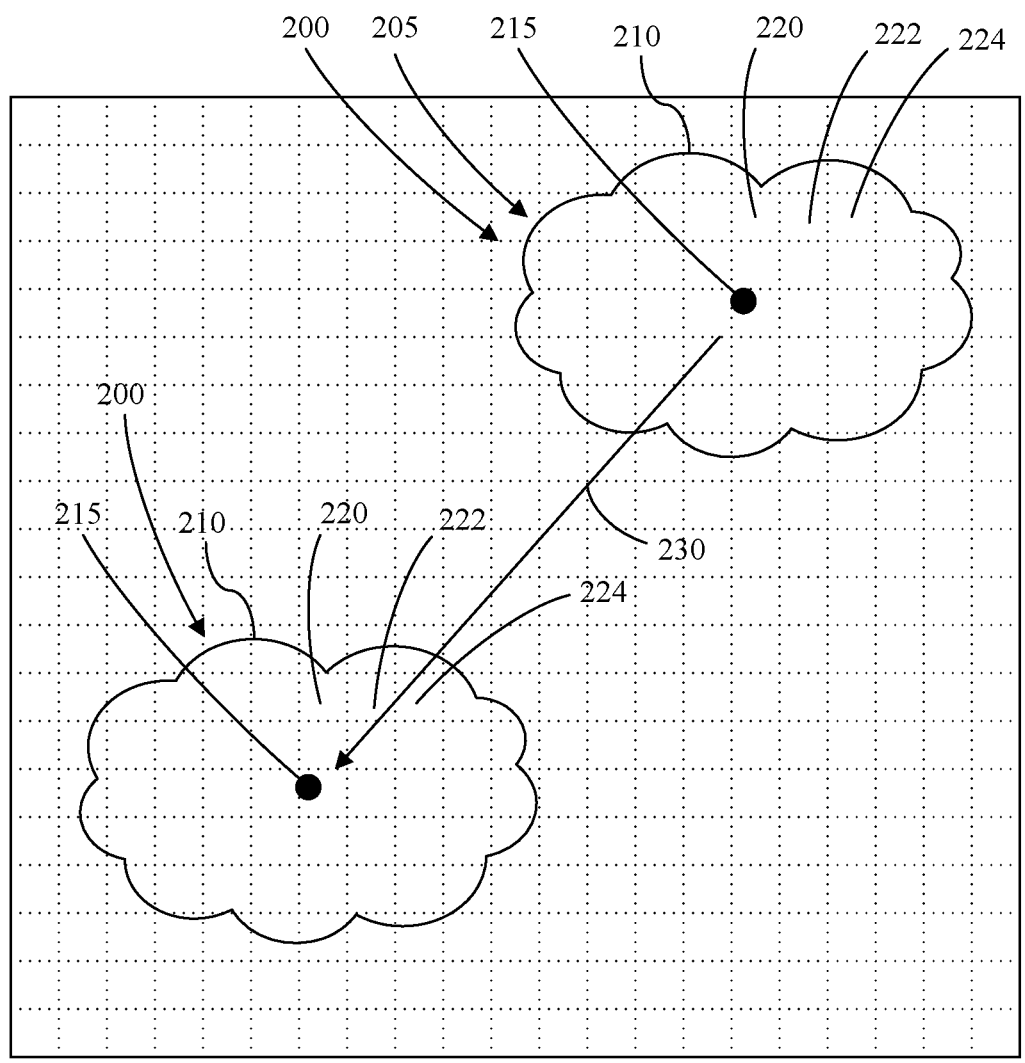
FIG. 2 is a diagram illustrating an example of a phenomenon present over a geographic region.

FIG. 2 is a diagram illustrating an example of a moving phenomenon (hereinafter "phenomenon") 200 present over a geographic region 205. Referring to FIGS. 1 and 2, based on the phenomenon data 140, for example at a particular time interval (e.g., $T_0$), the navigation service 112 can determine, in real time, a perimeter 210 of the phenomenon 200 and a centroid 215 of the phenomenon 200. The centroid 215 can be determined using techniques known to those of ordinary skill in the art. Further, the navigation service 112 can determine, in real time, an impact distribution for the phenomenon 200 over a plurality of phenomenon cells 220, 222, 224 and generate corresponding phenomenon impact distribution data. Each phenomenon cell 220-224 can represent a particular region of the phenomenon 200.

To generate the phenomenon impact distribution data, the navigation service 112 can define the plurality of phenomenon cells 220-224, wherein each phenomenon cell 220-224 is defined for a respective portion of the phenomenon 200. Further, the navigation service 112 can indicate, for each of the phenomenon cells 220-224, respective data indicating the impact of the phenomenon in the respective phenomenon cells 220-224. In illustration, the navigation service 112 can initialize a respective phenomenon impact agent 144 for each of the respective phenomenon cells 220-224. Each phenomenon impact agent 144 can be a functional data structure associated with one or more impact agent data tables 146. By way of example, a phenomenon impact agent 144 can be a particular instance of a class that references at least one record in one or more impact agent data tables 146 pertaining to that phenomenon impact agent 144.

Each phenomenon impact agent 144 can represent a respective phenomenon cell 220-224. Further, each phenomenon impact agent 144 can represent a velocity of the respective phenomenon cell 220-224, and a level of impact of the phenomenon 200 on driving conditions in the respective phenomenon cell 220-224. The level of impact can be a scalar value. The scalar value can be determined by executing an impact distribution function that determines an impact distribution of the phenomenon 200 based on the phenomenon data 140.

By way of example, in the case that the phenomenon is a rain storm, a phenomenon impact agent 144 for the phenomenon cell 220 can indicate a location of the phenomenon cell 220 with respect to the centroid 215, a velocity of the phenomenon cell 220, and a level of precipitation provided by the phenomenon 200 in that phenomenon cell 220. In the case that the phenomenon is air pollution, a phenomenon impact agent 144 for the phenomenon cell 220 can indicate a location of the phenomenon cell 220 with respect to the centroid 215, the velocity of the phenomenon cell 220, and a level of polluting particulates provided by the phenomenon 200 in that phenomenon cell 220. Still, the phenomenon impact agents 144 for the respective phenomenon cells 220-224 can indicate any other conditions that impact travel on at least one roadway, and the present arrangements are not limited in this regard.

Based on the phenomenon data 140 received over various time intervals, the navigation service 112 can determine a velocity 230 (e.g., direction and speed) of the centroid 215 of the phenomenon 200. In another arrangement, the velocity 230 can be provided by one or more external systems. Based on the velocity 230 of the centroid 215, the navigation service 112 can infer a velocity for each of the respective phenomenon cells 220-224, and thus a velocity for each of the respective phenomenon impact agents 144. Based on the velocities, the navigation service 112 can predict a geographic location of each of the respective phenomenon cells 220-224 for any given time for which the phenomenon continues to exist. Such geographic location predictions can be represented by the respective phenomenon impact agents 144 in the impact agent data table(s) 146.

The navigation service 112 can receive from one or more of the client devices 120-126 travel data 160. For each client device 120-126, the travel data 190 can indicate a current location of a respective vehicle and an intended destination of the respective vehicle. For each client device 120-126, based on the travel data 160, the navigation service 112 can initialize, in real time, one or more vehicle simulation agents 148. In illustration, the navigation service 112 can determine one or more travel routes that may be taken by a vehicle, based on the travel data 160, to travel from an initial location indicated by the travel data 160 to an intended destination indicated by the travel data 160. For each determined travel route, the navigation service 112 can initialize a respective vehicle simulation agent 148.

Each vehicle simulation agent 148 can be a functional data structure, for example, an object associated with one or more vehicle simulation data tables 150. In illustration, a vehicle simulation agent 148 can be a particular instance of a class that references at least one record in one or more vehicle simulation data tables 150 pertaining to that vehicle simulation agent 148. Thus, a particular vehicle simulation agent 148 can represent a particular candidate travel route that may be taken by a particular vehicle, associated with a respective client device 120-126, to travel from a present location to a desired destination. The navigation service 112 can determine the candidate travel routes using techniques known in the art.

For each client device 120-126, each of which are associated with a respective vehicle, the navigation service 112 can process, in real time, data associated with the phenomenon impact agents 144 with data associated with the respective vehicle simulation agents 148 to determine when and where travel of the vehicles will intersect respective phenomenon cells 220-224 of the phenomenon 200 for each of a plurality of candidate travel routes. Moreover, the navigation service 112 can determine a net impact of the phenomenon 200 on each of the vehicles for each of the candidate travel routes.

In illustration, for each vehicle simulation agent 148, the navigation service 112 can determine, based on the phenomenon impact agents 144 and the times when the vehicle simulation agent 148 will be within a threshold distance of the respective phenomenon cells 220-224, an impact of the phenomenon 200 on the vehicle. Moreover, the navigation service 112 can determine a net impact on the vehicle encountering a plurality of the phenomenon cells 220-224, and the impact of those phenomenon cells 220-224 on the vehicle at various times, using the vehicle simulation agents 148 and the phenomenon impact agents 144. It should be noted that the impact of any respective phenomenon cell 220-224 on the vehicle at any particular time may be related to the distance of vehicle from the phenomenon cell 220-224, and the vehicle may be impacted by one or more of the phenomenon cells 220-224 at any given time. In illustration, the net impact of the phenomenon 200 on the vehicle, for a particular vehicle simulation agent 148, may be determined using the following equation:

$$NI = \sum_{t=1}^{n} \sum_{i=1}^{m} \left( \frac{Qi}{Ri} \right)$$

where:
NI=net impact of a phenomenon on a vehicle;
t=time interval
i=phenomenon impact agent
Qi=local impact of phenomenon cell, represented by a respective phenomenon impact agent i, on vehicles
Ri=distance of the vehicle from phenomenon cell represented by the respective phenomenon impact agent i Thus, the net impact of the phenomenon on the vehicle can be determined based on a plurality of phenomenon impact agents, as well as a plurality of future time intervals, for example as the vehicle approaches and travels through the phenomenon 200.

In the above example, for any particular vehicle simulation agent 148, the phenomenon impact agents i can be limited to those phenomenon impact agents representing phenomenon cells 220-240 the vehicle may be predicted to intersect if travelling on the particular candidate travel route indicated by the vehicle simulation agent 148. Moreover, the prediction of whether the vehicle will intersect the phenomenon cells 220-240 can be based on the present location of the vehicle, the vehicles current velocity, the predicted travel route provided by the particular vehicle simulation agent 148, and predicted future locations of the phenomenon cells 220-240. The future locations of the phenomenon cells 220-240 can be predicted based on the inferred velocity for each of the respective phenomenon cells 220-224.

Further, the navigation service 112 can predict an amount of time for the vehicle to travel through the phenomenon 200 from the vehicles present location. The navigation service 112 can select a number n of time intervals t based on that amount of time. For example, assume navigation service 112 predicts that it will take the vehicle fifteen minutes to travel past the phenomenon for a given route. Also, assume the navigation service 112 selects each time interval to be one minute. Thus, the navigation service 112 can select the number n of time intervals t to be fifteen. If the navigation service 112 selects each time interval to be thirty seconds, the navigation service 112 can select the number n of time intervals t to be thirty. It should be noted, though, that the present arrangements are not limited in this regard. Any value of time interval can be used, for example, one second, five seconds, ten seconds, and so on. In one arrangement, the time interval value can be predefined.

The net impact of the phenomenon 200 on a vehicle can be predicted for any number of vehicle simulation agents 148 generated for that vehicle (or client device 120-126). The net impact of a phenomenon for each vehicle simulation agent 148 can be normalized to a value within a particular range, for example between 1 and 100, and assigned to the respective vehicle simulation agents 148. Based on the net impact of a phenomenon 200 for each vehicle simulation agent 148, the navigation service 112 can generate vehicle notifications 170.

By way of example, if four vehicle simulation agents 148 are initialized for the client device 122 based on the travel data 160, the vehicle notification 170 communicated to the client device 122 can indicate respective travel routes represented by the vehicle simulation agents 148, and the impact of the phenomenon 200 on each of the travel routes. Accordingly, the driver receiving the vehicle notification 170 can consider the respective travel routes and the impact of the phenomenon 200 on each of the travel routes when determining which travel route to take.

Figure 3:
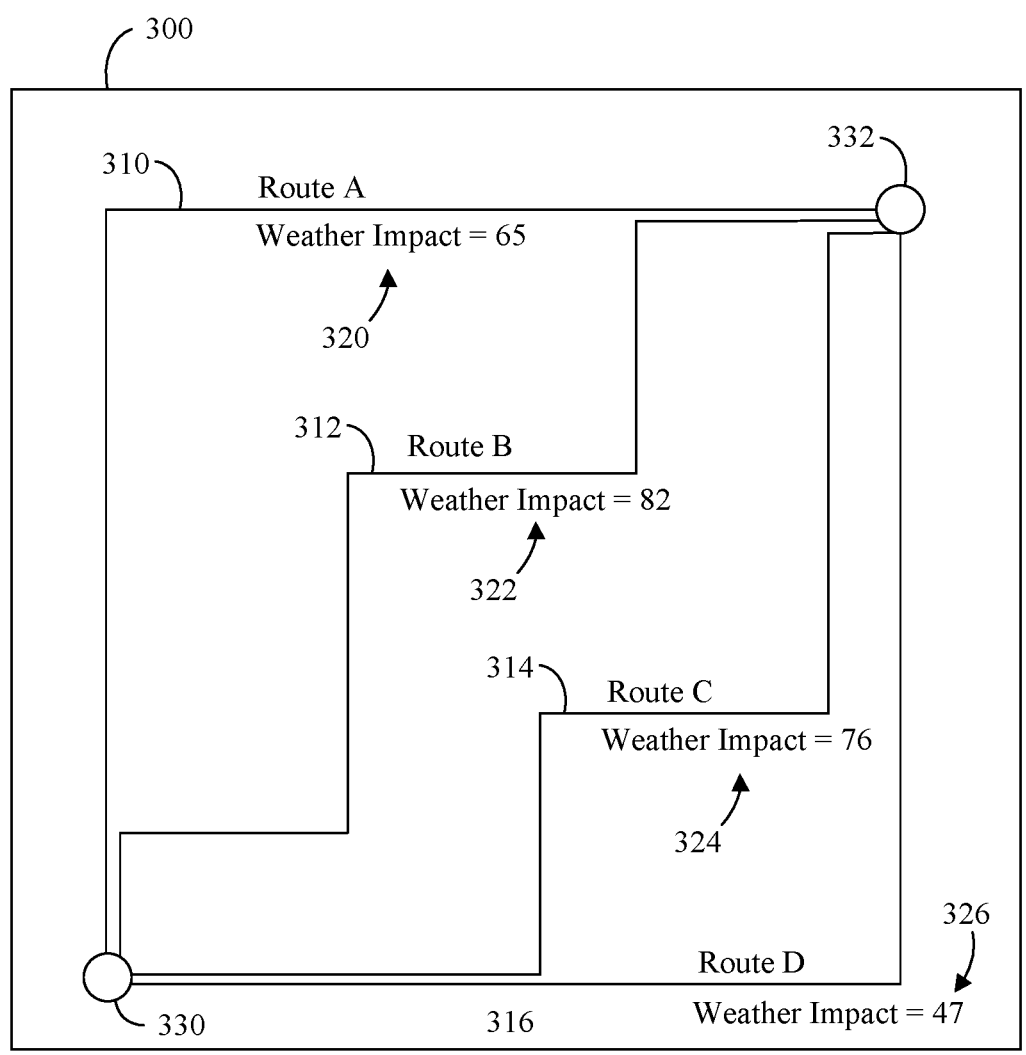
FIG. 3 is a diagram illustrating an example of a map presenting a plurality of candidate travel routes with vehicle notifications.

FIG. 3 is a diagram illustrating an example of a map 300 presenting a plurality of candidate travel routes 310, 312, 314, 316 with vehicle notifications 320, 322, 324, 326. From the travel data 160 communicated from the client device 122 to the navigation service 112, the navigation service can, using techniques known in the art, determine the candidate travel routes 310-316 as potential routes the vehicle associated with the client device 122 may take to travel from a current location 330 to an intended destination 332. The current location 330 and intended destination 332 can be indicated in the travel data 160 using GPS coordinates, addresses, or any other suitable location data.

As noted, for each candidate travel route 310-316, the navigation service 112 can determine the impact of the phenomenon 200 on the candidate travel route 310-316. In this example, the phenomenon can be a weather event. In the map 300, the navigation service 112 can indicate a respective vehicle notification 320-326 for each candidate travel route 310-316. Each vehicle notification 320-326 can indicate a nature of the phenomenon and a respective score indicating the net impact of the phenomenon 200 on the vehicle if the vehicle were to travel along the respective candidate travel route 310-316.

The navigation service 112 can communicate the map 300 to the driver of the vehicle. For example, the navigation service 112 can communicate the map 300 to the client device 122, and the client device 122 can present the map 300 on a display of the client device 122. Further, the navigation service 112 can update the map 300 over time, for example as the vehicle travels. In this regard, the navigation service 112 can update the respective scores indicating the net impact of the phenomenon 200 on the vehicle as time passes. In illustration, the navigation service 112 can periodically update (e.g., recalculate) the scores, for example every ten seconds, every thirty seconds, every minute, every two minutes, and so on. Thus, the scores presented at any particular time can be based on the most recent phenomenon data 140 and the vehicle's present location. Moreover, the navigation service 112 can add, delete or change candidate travel routes 310-316 in the map 300 based on the vehicle's present location and direction of travel.

Figure 4:
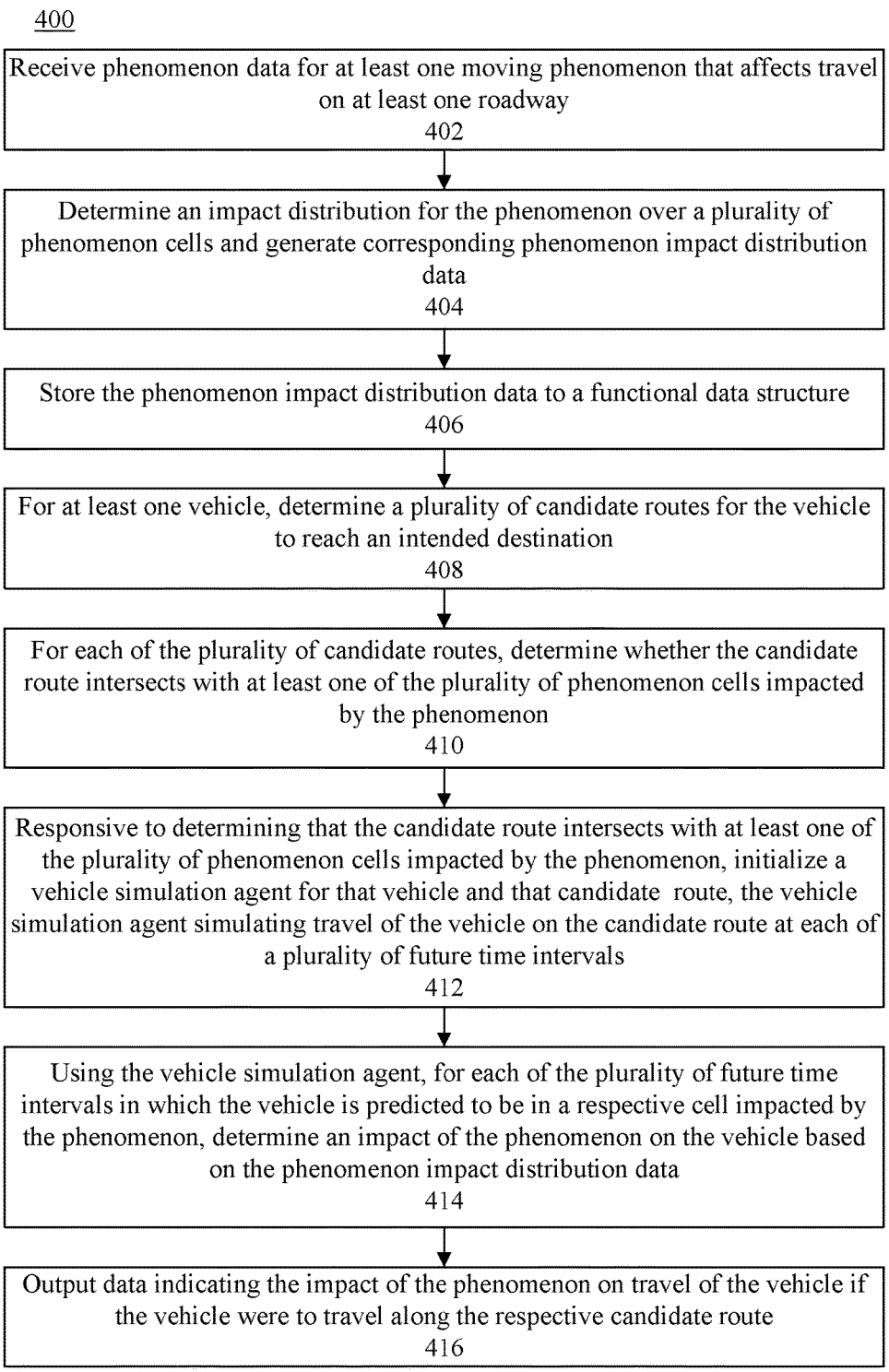
FIG. 4 is a flow chart illustrating an example of a method of predicting an impact of a moving phenomenon on a travelling vehicle.

FIG. 4 is a flow chart illustrating an example of a method 400 of predicting an impact of a moving phenomenon on a travelling vehicle. The method 400 can be implemented by the navigation service 112 of FIG. 1.

At step 402, the navigation service 112 can receive phenomenon data for at least one moving phenomenon that affects travel on at least one roadway. At step 404, based on the phenomenon data, the navigation service 112 can determine an impact distribution for the phenomenon over a plurality of phenomenon cells and generate corresponding phenomenon impact distribution data. At step 406, the navigation service 112 can store the phenomenon impact distribution data to a functional data structure.

At step 408, the navigation service 112 can, for at least one vehicle, determine a plurality of candidate routes for the vehicle to reach an intended destination. At step 410, the navigation service 112 can, for each of the plurality of candidate routes, determine whether the candidate route intersects with at least one of the plurality of phenomenon cells impacted by the phenomenon. At step 412, the navigation service 112 can, responsive to determining that the candidate route intersects with at least one of the plurality of phenomenon cells impacted by the phenomenon, initialize a vehicle simulation agent for that vehicle and that candidate route, the vehicle simulation agent simulating travel of the vehicle on the candidate route at each of a plurality of future time intervals. At step 414, the navigation service 112 can, using the vehicle simulation agent, for each of the plurality of future time intervals in which the vehicle is predicted to be in a respective cell impacted by the phenomenon, determine an impact of the phenomenon on the vehicle based on the phenomenon impact distribution data. At step 416, the navigation service 112 can output data indicating the impact of the phenomenon on travel of the vehicle if the vehicle were to travel along the respective candidate route.

Figure 5:
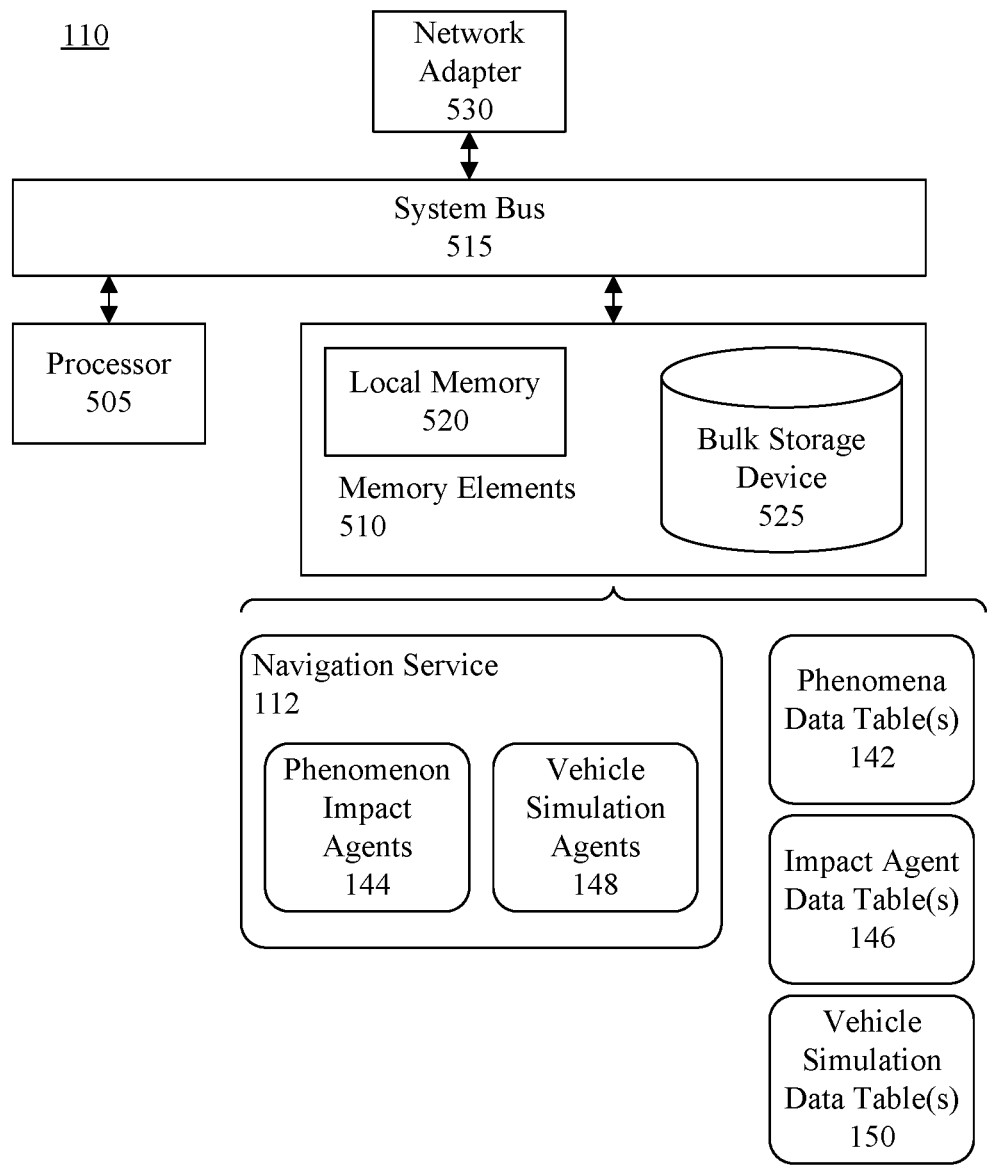
FIG. 5 is a block diagram illustrating example architecture for a navigation server.

FIG. 5 is a block diagram illustrating example architecture for the navigation server 110. The navigation server 110 can include at least one processor 505 (e.g., a central processing unit) coupled to memory elements 510 through a system bus 515 or other suitable circuitry. As such, the navigation server 110 can store program code within the memory elements 510. The processor 505 can execute the program code accessed from the memory elements 510 via the system bus 515. It should be appreciated that the navigation server 110 can be implemented in the form of any system including a processor and memory that is capable of performing the functions and/or operations described within this specification. For example, the navigation server 110 can be implemented as a server, a plurality of communicatively linked servers, and so on.

The memory elements 510 can include one or more physical memory devices such as, for example, local memory 520 and one or more bulk storage devices 525. Local memory 520 refers to random access memory (RAM) or other non-persistent memory device(s) generally used during actual execution of the program code. The bulk storage device(s) 525 can be implemented as a hard disk drive (HDD), solid state drive (SSD), or other persistent data storage device. The navigation server 110 also can include one or more cache memories (not shown) that provide temporary storage of at least some program code in order to reduce the number of times program code must be retrieved from the bulk storage device 525 during execution.

One or more network adapters 530 can be coupled to navigation server 110 to enable the navigation server 110 to become coupled to client devices, other systems, computer systems, remote printers, and/or remote storage devices through intervening private or public networks. Modems, cable modems, transceivers, and Ethernet cards are examples of different types of network adapters 530 that can be used with the navigation server 110.

As pictured in FIG. 5, the memory elements 510 can store the components of the navigation server 110 of FIG. 1, namely the navigation service 112, phenomenon impact agents 144, vehicle simulation agents 148, phenomena data tables 142, impact agent data tables 146 and vehicle simulation data tables 150. Being implemented in the form of executable program code, the navigation service 112, phenomenon impact agents 144 and vehicle simulation agents 148 can be executed by the navigation server 110 and, as such, can be considered part of the navigation server 110. Moreover, the navigation service 112, phenomenon impact agents 144, vehicle simulation agents 148, phenomena data tables 142, impact agent data tables 146 and vehicle simulation data tables 150 are functional data structures that impart functionality when employed as part of the navigation server 110.

While the disclosure concludes with claims defining novel features, it is believed that the various features described herein will be better understood from a consideration of the description in conjunction with the drawings. The process(es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," or similar language means that a particular feature, structure, or characteristic described in connection with the embodiment is included in at least one embodiment described within this disclosure. Thus, appearances of the phrases "in one embodiment," "in an embodiment," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
receiving phenomenon data for at least one moving phenomenon that affects travel on at least one roadway;
based on the phenomenon data, determining an impact distribution for the phenomenon over a plurality of phenomenon cells and generating corresponding phenomenon impact distribution data;
storing the phenomenon impact distribution data to a functional data structure;
for at least one vehicle, determining a plurality of candidate routes for the vehicle to reach an intended destination and, for each of the plurality of candidate routes:
determining whether the candidate route intersects with at least one of the plurality of phenomenon cells impacted by the phenomenon;
responsive to determining that the candidate route intersects with at least one of the plurality of phenomenon cells impacted by the phenomenon, initializing a vehicle simulation agent for that vehicle and that candidate route, the vehicle simulation agent simulating travel of the vehicle on the candidate route at each of a plurality of future time intervals;
using the vehicle simulation agent, for each of the plurality of future time intervals in which the vehicle is predicted to be in a respective cell impacted by the phenomenon, determining, using a processor, an impact of the phenomenon on the vehicle based on the phenomenon impact distribution data;
aggregating data indicating the impact of the phenomenon on the vehicle in each of a plurality of phenomenon cells with which the candidate route intersects;
generating normalized phenomenon impact data by normalizing the aggregated data to a value within a particular range between a minimum value and a maximum value; and
outputting the normalized phenomenon impact data indicating the impact of the phenomenon on travel of the vehicle if the vehicle were to travel along the respective the route.

2. The method of claim 1, further comprising:
defining the plurality of phenomenon cells, each phenomenon cell defined for a respective portion of the moving phenomenon;
wherein generating the corresponding phenomenon impact distribution data comprises determining, for each of the phenomenon cells, a respective impact of the phenomenon cell on the vehicle.

3. The method of claim 2, further comprising:
initializing a phenomenon impact agent for each of the plurality of phenomenon cells, each phenomenon impact agent representing a respective one of the plurality of phenomenon cells and a level of impact of the phenomenon on driving conditions in the respective phenomenon cell.

4. The method of claim 1, further comprising:
communicating a notification based on the normalized phenomenon impact data to a driver of the vehicle.

5. The method of claim 4, wherein the notification indicates the normalized phenomenon impact data for each of the plurality of candidate routes for the vehicle to reach an intended destination.

6. The method of claim 5, wherein the normalized phenomenon impact data for each of the plurality of candidate routes is presented with the respective candidate routes in a map that presents the respective candidate routes.

7. The method of claim 6, further comprising:
presenting in the map, with the normalized phenomenon impact data, data indicating a nature of the phenomenon.

8. The method of claim 1, further comprising:
periodically updating the normalized phenomenon impact data based on recent phenomenon data and a present location of the vehicle; and
outputting the updated normalized phenomenon impact data.

9. A system, comprising:
a processor programmed to initiate executable operations comprising:
receiving phenomenon data for at least one moving phenomenon that affects travel on at least one roadway;
based on the phenomenon data, determining an impact distribution for the phenomenon over a plurality of phenomenon cells and generating corresponding phenomenon impact distribution data;
storing the phenomenon impact distribution data to a functional data structure;
for at least one vehicle, determining a plurality of candidate routes for the vehicle to reach an intended destination and, for each of the plurality of candidate routes:
determining whether the candidate route intersects with at least one of the plurality of phenomenon cells impacted by the phenomenon;
responsive to determining that the candidate route intersects with at least one of the plurality of phenomenon cells impacted by the phenomenon, initializing a vehicle simulation agent for that vehicle and that candidate route, the vehicle simulation agent simulating travel of the vehicle on the candidate route at each of a plurality of future time intervals;
using the vehicle simulation agent, for each of the plurality of future time intervals in which the vehicle is predicted to be in a respective cell impacted by the phenomenon, determining an impact of the phenomenon on the vehicle based on the phenomenon impact distribution data;
aggregating data indicating the impact of the phenomenon on the vehicle in each of a plurality of phenomenon cells with which the candidate route intersects;
generating normalized phenomenon impact data by normalizing the aggregated data to a value within a particular range between a minimum value and a maximum value; and
outputting the normalized phenomenon impact data indicating the impact of the phenomenon on travel of the vehicle if the vehicle were to travel along the respective the route.

10. The system of claim 9, the executable operations further comprising:
defining the plurality of phenomenon cells, each phenomenon cell defined for a respective portion of the moving phenomenon;
wherein generating the corresponding phenomenon impact distribution data comprises determining, for each of the phenomenon cells, a respective impact of the phenomenon cell on the vehicle.

11. The system of claim 10, the executable operations further comprising:
initializing a phenomenon impact agent for each of the plurality of phenomenon cells, each phenomenon impact agent representing a respective one of the plurality of phenomenon cells and a level of impact of the phenomenon on driving conditions in the respective phenomenon cell.

12. The system of claim 9, the executable operations further comprising:
communicating a notification based on the normalized phenomenon impact data to a driver of the vehicle.

13. The system of claim 12, wherein the notification indicates the normalized phenomenon impact data for each of the plurality of candidate routes for the vehicle to reach an intended destination.

14. The system of claim 13, wherein the normalized phenomenon impact data for each of the plurality of candidate routes is presented with the respective candidate routes in a map that presents the respective candidate routes.

15. The system of claim 14, the executable operations further comprising:
presenting in the map, with the normalized phenomenon impact data, data indicating a nature of the phenomenon.

16. The system of claim 9, the executable operations further comprising:
periodically updating the normalized phenomenon impact data based on recent phenomenon data and a present location of the vehicle; and
outputting the updated normalized phenomenon impact data.

17. A computer program product comprising a computer readable storage medium having program code stored thereon, the program code executable by a processor to perform a method comprising:
receiving, by the processor, phenomenon data for at least one moving phenomenon that affects travel on at least one roadway;
based on the phenomenon data, determining, by the processor, an impact distribution for the phenomenon over a plurality of phenomenon cells and generating, by the processor, corresponding phenomenon impact distribution data;
storing, by the processor, the phenomenon impact distribution data to a functional data structure;
for at least one vehicle, determining, by the processor, a plurality of candidate routes for the vehicle to reach an intended destination and, for each of the plurality of candidate routes:
determining, by the processor, whether the candidate route intersects with at least one of the plurality of phenomenon cells impacted by the phenomenon;

responsive to determining that the candidate route intersects with at least one of the plurality of phenomenon cells impacted by the phenomenon, initializing, by the processor, a vehicle simulation agent for that vehicle and that candidate route, the vehicle simulation agent simulating travel of the vehicle on the candidate route at each of a plurality of future time intervals;

using the vehicle simulation agent, for each of the plurality of future time intervals in which the vehicle is predicted to be in a respective cell impacted by the phenomenon, determining, by the processor, an impact of the phenomenon on the vehicle based on the phenomenon impact distribution data;

aggregating, by the processor, data indicating the impact of the phenomenon on the vehicle in each of a plurality of phenomenon cells with which the candidate route intersects;

generating, by the processor, normalized phenomenon impact data by normalizing the aggregated data to a value within a particular range between a minimum value and a maximum value; and outputting, by the processor, the normalized phenomenon impact data indicating the impact of the phenomenon on travel of the vehicle if the vehicle were to travel along the respective the route.

18. The computer program product of claim 17, the method further comprising:

defining the plurality of phenomenon cells, each phenomenon cell defined for a respective portion of the moving phenomenon;

wherein generating the corresponding phenomenon impact distribution data comprises determining, for each of the phenomenon cells, a respective impact of the phenomenon cell on the vehicle.

19. The computer program product of claim 18, the method further comprising:

initializing a phenomenon impact agent for each of the plurality of phenomenon cells, each phenomenon impact agent representing a respective one of the plurality of phenomenon cells and a level of impact of the phenomenon on driving conditions in the respective phenomenon cell.

20. The computer program product of claim 17, the method further comprising:

communicating a notification based on the normalized phenomenon impact data to a driver of the vehicle.

21. The computer program product of claim 20, wherein the notification indicates the normalized phenomenon impact data for each of the plurality of candidate routes for the vehicle to reach an intended destination.

22. The computer program product of claim 21, wherein the normalized phenomenon impact data for each of the plurality of candidate routes is presented with the respective candidate routes in a map that presents the respective candidate routes.

23. The computer program product of claim 22, the method further comprising:

presenting in the map, with the normalized phenomenon impact data, data indicating a nature of the phenomenon.

24. The computer program product of claim 17, the method further comprising:

periodically updating the normalized phenomenon impact data based on recent phenomenon data and a present location of the vehicle; and outputting the updated normalized phenomenon impact data.

* * * * *